United States Patent
Skelton

(10) Patent No.: US 12,478,490 B2
(45) Date of Patent: Nov. 25, 2025

(54) CONSTRAINING MECHANISMS FOR SELECTIVE DEPLOYMENT AND ASSOCIATED METHODS

(71) Applicant: W. L. Gore & Associates, Inc., Newark, DE (US)

(72) Inventor: Tyson J. Skelton, Flagstaff, AZ (US)

(73) Assignee: W. L. Gore & Associates, Inc., Newark, DE (US)

( * ) Notice: Subject to any disclaimer, the term of this patent is extended or adjusted under 35 U.S.C. 154(b) by 989 days.

(21) Appl. No.: 17/608,321

(22) PCT Filed: May 10, 2019

(86) PCT No.: PCT/US2019/031769
§ 371 (c)(1),
(2) Date: Nov. 2, 2021

(87) PCT Pub. No.: WO2020/231388
PCT Pub. Date: Nov. 19, 2020

(65) Prior Publication Data
US 2022/0211528 A1      Jul. 7, 2022

(51) Int. Cl.
*A61F 2/97*  (2013.01)
*D04B 21/20*  (2006.01)

(52) U.S. Cl.
CPC .............. *A61F 2/97* (2013.01); *D04B 21/202* (2013.01); *D04B 21/205* (2013.01); *D10B 2509/06* (2013.01)

(58) Field of Classification Search
CPC .. A61F 2/95; A61F 2/97; A61F 2/2439; A61F 2002/9511; A61F 2002/962; A61F 2002/966; D04B 21/202; D04B 21/205; D04B 19/00; D04B 2509/06
See application file for complete search history.

(56) References Cited

U.S. PATENT DOCUMENTS

| | | | |
|---|---|---|---|
| 4,878,906 A | 11/1989 | Lindemann et al. | |
| 5,405,378 A | 4/1995 | Strecker | |
| 5,671,790 A | 9/1997 | Andersen et al. | |
| 6,082,144 A | 7/2000 | Jencks et al. | |

(Continued)

FOREIGN PATENT DOCUMENTS

| | | |
|---|---|---|
| CA | 2456046 A1 | 12/1999 |
| CN | 201578402 U | 9/2010 |

(Continued)

OTHER PUBLICATIONS

Beute et al., "Use of EN Snare device for successful repositioning of the newest self-expanding transcatheter heart valve", SAGE, vol. 6, No. 1, Dec. 2018, pp. 1-3.

(Continued)

*Primary Examiner* — Diane D Yabut

(57) ABSTRACT

Various aspects of the present disclosure are directed toward medical device deployment apparatuses, systems, and methods. The apparatuses, systems, and methods may include at least one first constraining fiber arranged as a series of multiple loops to form a warp knit surrounding the medical device in a constrained configuration and at least one second constraining fiber arranged with the at least one first constraining fiber having at least one loop arranged in a non-warp knit pattern.

20 Claims, 8 Drawing Sheets

(56) References Cited

U.S. PATENT DOCUMENTS

| | | |
|---|---|---|
| 6,224,627 B1 | 5/2001 | Armstrong et al. |
| 6,302,891 B1 | 10/2001 | Nadal |
| 6,315,792 B1 | 11/2001 | Armstrong et al. |
| 6,315,795 B1 | 11/2001 | Scarborough et al. |
| 6,352,553 B1 | 3/2002 | Van et al. |
| 6,514,281 B1 | 2/2003 | Blaeser et al. |
| 6,688,141 B1 | 2/2004 | Kuenzel et al. |
| 9,375,215 B2 | 6/2016 | Cully et al. |
| 9,427,307 B2 | 8/2016 | Pearson et al. |
| 9,439,791 B2 | 9/2016 | Vong et al. |
| 9,622,893 B2 | 4/2017 | Huser |
| 9,717,612 B2 | 8/2017 | Dorn et al. |
| 9,987,155 B1 | 6/2018 | Sondreaal |
| 2002/0045930 A1 | 4/2002 | Burg et al. |
| 2004/0122503 A1* | 6/2004 | Campbell ............... A61F 2/97 623/1.12 |
| 2004/0243215 A1 | 12/2004 | Nelson |
| 2005/0090890 A1 | 4/2005 | Wu et al. |
| 2007/0038310 A1 | 2/2007 | Guetty |
| 2007/0106364 A1 | 5/2007 | Buzzard et al. |
| 2008/0255580 A1 | 10/2008 | Hoffman et al. |
| 2009/0326640 A1 | 12/2009 | Yoshimura et al. |
| 2010/0011976 A1 | 1/2010 | Armstrong et al. |
| 2010/0030321 A1 | 2/2010 | Mach |
| 2010/0152829 A1 | 6/2010 | Edelman et al. |
| 2011/0218608 A1 | 9/2011 | Cheng et al. |
| 2011/0218613 A1 | 9/2011 | Leopold et al. |
| 2012/0046652 A1 | 2/2012 | Sokel |
| 2012/0130475 A1 | 5/2012 | Shaw |
| 2012/0259406 A1 | 10/2012 | Schreck et al. |
| 2013/0123900 A1 | 5/2013 | Eblacas et al. |
| 2013/0245745 A1 | 9/2013 | Vong et al. |
| 2013/0289713 A1 | 10/2013 | Pearson et al. |
| 2014/0148895 A1 | 5/2014 | King |
| 2014/0180378 A1 | 6/2014 | Roeder |
| 2014/0200649 A1 | 7/2014 | Essinger et al. |
| 2014/0277363 A1 | 9/2014 | Armstrong et al. |
| 2015/0081000 A1 | 3/2015 | Hossainy et al. |
| 2015/0082595 A1 | 3/2015 | King |
| 2015/0173753 A1 | 6/2015 | Spivey et al. |
| 2015/0250630 A1 | 9/2015 | Irwin et al. |
| 2016/0199207 A1 | 7/2016 | Treacy et al. |
| 2017/0151079 A1 | 6/2017 | Shaw |
| 2017/0189212 A1 | 7/2017 | Eller et al. |
| 2017/0348099 A1 | 12/2017 | Mendelson et al. |
| 2018/0280171 A1 | 10/2018 | Gloss et al. |
| 2020/0368051 A1 | 11/2020 | Byrne et al. |
| 2021/0386567 A1* | 12/2021 | Stastka ............... A61B 90/92 |
| 2021/0386569 A1 | 12/2021 | Stastka |
| 2022/0031485 A1 | 2/2022 | Ramirez et al. |
| 2022/0211529 A1 | 7/2022 | Skelton |
| 2022/0296399 A1 | 9/2022 | Broyles et al. |
| 2023/0099043 A1 | 3/2023 | Stastka |
| 2023/0225891 A1 | 7/2023 | Stastka |
| 2024/0299198 A1 | 9/2024 | Honeyfield |

FOREIGN PATENT DOCUMENTS

| | | |
|---|---|---|
| CN | 102088928 A | 6/2011 |
| CN | 102639086 A | 8/2012 |
| CN | 103547235 A | 1/2014 |
| CN | 103945798 A | 7/2014 |
| CN | 105530895 A | 4/2016 |
| CN | 105899167 A | 8/2016 |
| CN | 106102596 A | 11/2016 |
| CN | 109688984 A | 4/2019 |
| EP | 0950385 A2 | 10/1999 |
| EP | 1087726 A1 | 4/2001 |
| EP | 2298248 A1 | 3/2011 |
| EP | 2735283 A1 | 5/2014 |
| EP | 2749251 B1 | 7/2016 |
| JP | 06-503734 A | 4/1994 |
| JP | 2000-503359 A | 3/2000 |
| JP | 2000-503559 A | 3/2000 |
| JP | 2002-518086 A | 6/2002 |
| JP | 2003-052833 A | 2/2003 |
| JP | 2005-270432 A | 10/2005 |
| JP | 2005-304792 A | 11/2005 |
| JP | 2006-510453 A | 3/2006 |
| JP | 2009-523565 A | 6/2009 |
| JP | 2010-526583 A | 8/2010 |
| JP | 2014-501563 A | 1/2014 |
| JP | 2018-501902 A | 1/2018 |
| JP | 2021-566524 A | 7/2022 |
| WO | 97/21402 A1 | 6/1997 |
| WO | 99/65420 A1 | 12/1999 |
| WO | 2007/084762 A2 | 7/2007 |
| WO | 2008/137177 A2 | 11/2008 |
| WO | 2009/140861 A1 | 11/2009 |
| WO | 2012/068046 A2 | 5/2012 |
| WO | 2016/115007 A1 | 7/2016 |
| WO | 2019/075069 A1 | 4/2019 |
| WO | 2019/240799 A1 | 12/2019 |
| WO | 2019/240800 A1 | 12/2019 |
| WO | 2020/068957 A1 | 4/2020 |
| WO | 2020/231387 A1 | 11/2020 |
| WO | 2021/173648 A1 | 9/2021 |

OTHER PUBLICATIONS

European Search Report for EP Patent Application No. 23170894.2, Issued on Oct. 20, 2023, 10 pages.
International Preliminary Report on Patentability received for PCT Patent Application No. PCT/US2021/019386, mailed on Sep. 9, 2022, 9 pages.
International Preliminary Report on Patentability received for PCT Patent Application No. PCT/US2021/025919, mailed on Oct. 19, 2023, 13 pages.
Lee et al., Sheath-assisted controlled deployment technique for Excluder bifurcated main body, Journal of Vascular Surgery, vol. 43, No. 5, May 2006, pp. 1060-1063.
Xiao-Dong et al., "A patent analysis of biodegradable vascular scaffolds", Chinese Journal of Tissue Engineering Research, vol. 22, No. 2, 2018, pp. 303-309.
Zhang et al., "Application of Knitting Structure Textiles in Medical Areas", Autex Research Journal, vol. 18, No. 2, Jun. 12, 2018, pp. 1-11.
Dictionary Definition of "KNIT" Dictionary.com, https://www.dictionary.com/browse/knit. (Year: 2024).
Dictionary Definition of "KNOT" Dictionary.com, https://www.dictionary.com/browse/knot. (Year: 2024).
"About Denier" https://standardfiber.com/about-denier (Year: 2012).
"What is Denier" https://www.onlinefabricstore.com/makersmill/what-is-denier/ (Year: 2012).
International Preliminary Report on Patentability received for PCT Patent Application No. PCT/US2021/037311, mailed on Dec. 29, 2022, 8 pages.
International Search Report and Written Opinion received for PCT Patent Application No. PCT/US2021/037311, mailed on Sep. 30, 2021, 12 pages.
Merriam-Wester online dictionary, "knit" definition, accessed on Aug. 24, 2023, https://www.merriam-webster.com/dictionary/knit (Year: 2023) (Year: 2023).
International Search Report and Written Opinion received for PCT Patent Application No. PCT/US21/25919, mailed on Dec. 23, 2021, 20 pages.
International Preliminary Report on Patentability received for PCT Patent Application No. PCT/US2019/031761, mailed on Nov. 25, 2021, 9 pages.
International Preliminary Report on Patentability received for PCT Patent Application No. PCT/US2019/031769, mailed on Nov. 25, 2021, 10 pages.
International Preliminary Report on Patentability received for PCT Patent Application No. PCT/US2019/031780, mailed on Nov. 25, 2021, 7 pages.
International Preliminary Report on Patentability received for PCT Patent Application No. PCT/US2019/052921, mailed on Apr. 8, 2021, 8 pages.

(56) References Cited

OTHER PUBLICATIONS

International Preliminary Report on Patentability received for PCT Patent Application No. PCT/US2019/054630, mailed on Apr. 15, 2021, 9 pages.
International Preliminary Report on Patentability received for PCT Patent Application No. PCT/US2019/054652, mailed on Apr. 15, 2021, 8 pages.
International Search Report and Written Opinion received for PCT Patent Application No. PCT/US2019/031761, mailed on Jan. 22, 2020, 11 pages.
International Search Report and Written Opinion received for PCT Patent Application No. PCT/US2019/031769, mailed on Jan. 23, 2020, 16 pages.
International Search Report and Written Opinion received for PCT Patent Application No. PCT/US2019/031780, mailed on Jan. 20, 2020, 8 pages.
International Search Report and Written Opinion received for PCT Patent Application No. PCT/US2019/052921, mailed on Jan. 29, 2020, 13 pages.
International Search Report and Written Opinion received for PCT Patent Application No. PCT/US2019/054630, mailed on Jan. 29, 2020, 11 pages.
International Search Report and Written Opinion received for PCT Patent Application No. PCT/US2019/054652, mailed on Jan. 29, 2020, 9 pages.
International Search Report and Written Opinion received for PCT Patent Application No. PCT/US21/19386, mailed on Jun. 18, 2021, 12 pages.

\* cited by examiner

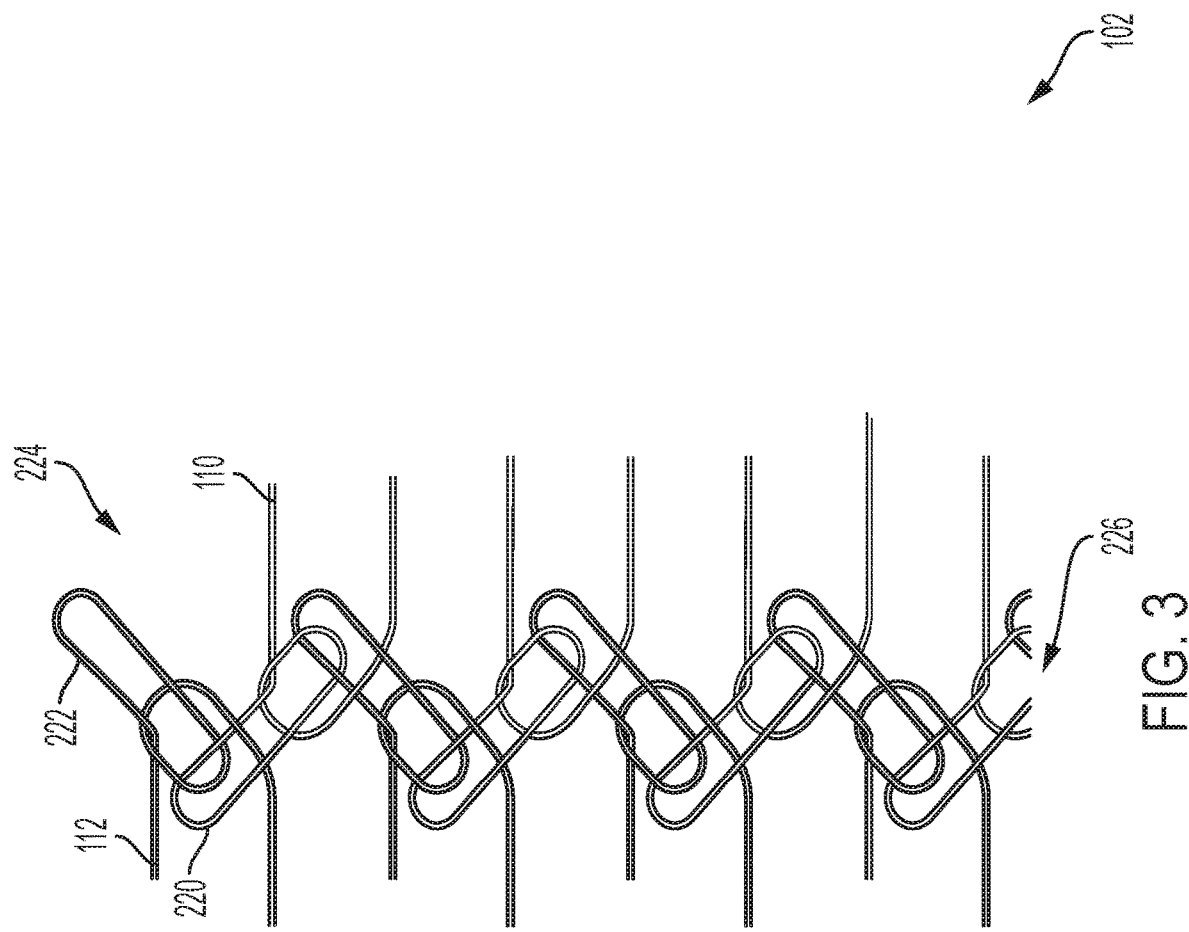

CONSTRAINING MECHANISMS FOR SELECTIVE DEPLOYMENT AND ASSOCIATED METHODS

CROSS-REFERENCE TO RELATED APPLICATION

This application is a national phase application of PCT Application No. PCT/US2019/031769, internationally filed on May 10, 2019, which is herein incorporated by reference in its entirety for all purposes.

FIELD

The present disclosure relates to apparatuses, systems, and methods that include constraints used in delivery of implantable medical devices. More specifically, the present disclosure relates to apparatuses, systems, and methods that include constraints for selective deployment of an expandable device during device delivery.

BACKGROUND

Stents and stent-grafts, or other implantable medical devices, may be utilized to radially support a variety of tubular passages in the body, including arteries, veins, airways, gastrointestinal tracts, and biliary tracts. The preferred method of placing these devices has been to use specialized delivery systems to precisely place and deploy a device at the site to be treated. These delivery systems allow the practitioner to minimize the trauma and technical difficulties associated with device placements. Attributes of delivery systems include: low profile; ability to pass through introducer sheaths; ability to negotiate tortuous vasculature, smoothly and atraumatically; protection of constrained devices; and ability to accurately position and deploy the device.

Stents or stent-grafts may be deployed and plastically deformed, such as by using an inflatable balloon, or to self-expand, such as through elastic recovery, from a collapsed or constrained delivery diameter to an expanded and deployed diameter. Some stents are designed to elastically recover by being manufactured at their functional diameter out of a material that has elastic recovery properties, and then radially compressed to be mounted on a delivery catheter.

These stent and stent-graft devices may be held, compressed, or constrained in the delivery configuration prior to and during delivery to a target location.

SUMMARY

According to one example ("Example 1"), a medical device deployment apparatus includes at least one first constraining fiber arranged as a series of multiple loops to form a warp knit surrounding the medical device in a constrained configuration, the warp knit being configured to separate and be removed to deploy the medical device; and at least one second constraining fiber arranged with the at least one first constraining fiber, the at least one second constraining fiber having at least one loop arranged in a non-warp knit pattern.

According to another example ("Example 2"), further to the apparatus of Example 1, the at least one first constraining fiber comprises multiple fibers knitted together.

According to another example ("Example 3"), further to the apparatus of any one of Examples 1-2, the first constraining fiber and the at least one second constraining fiber form a constraint, and the at least one loop arranged in the non-warp knit pattern is arranged at a distal end of the constraint.

According to another example ("Example 4"), further to the apparatus of Example 3, the at least one loop arranged in the non-warp knit pattern is arranged in a chain-link stich.

According to another example ("Example 5"), further to the apparatus of Example 4, the at least one first constraining fiber is interwoven with the at least one second constraining fiber to form the constraint with each of the at least one first constraining fiber and the at least one second constraining fiber forming a row of knots.

According to another example ("Example 6"), further to the apparatus of Example 5, a first row of the row of knots is formed by the at least one first constraining fiber in the warp knit pattern and a second row of the row of knots is formed by the at least one second constraining fiber in a non-warp knit pattern.

According to another example ("Example 7"), further to the apparatus of Example 6, the non-warp knit pattern of the second row includes chain-link stiches.

According to another example ("Example 8"), further to the apparatus of any one of Examples 1-6 the at least one first constraining fiber includes the first constraining fiber and a third constraining fiber, and the at least one second constraining fiber includes the second constraining fiber and a fourth constraining fiber with the first constraining fiber, second constraining fiber, the third constraining fiber, and the fourth constraining fiber being interwoven to form a constraint.

According to another example ("Example 9"), further to the apparatus of Example 8, the constraint includes multiple knot rows including a first row of knots formed by the first constraining fiber interwoven with the second constraining fiber, and a second row of knots formed by the second constraining fiber interwoven with the third constraining fiber, a third row of knots formed by the third constraining fiber interwoven with the fourth constraining fiber, and a fourth row of knots formed by the fourth constraining fiber interwoven with the first constraining fiber.

According to another example ("Example 10"), further to the apparatus of Example 9, at least one of the multiple knot forms a warp knit surrounding the medical device in the constrained configuration and another one of the multiple knot forms a non-warp knit surrounding the medical device in the constrained configuration.

According to another example ("Example 11"), further to the apparatus of any one of Examples 1-10, the at least one first constraining fiber and the at least one second constraining fiber combine to form a deployment line.

According to another example ("Example 12"), further to the apparatus of any one of Examples 1-11, the warp knit is configured to separate and be removed to deploy the medical device and the warp knit is arranged with the non-warp knit pattern interrupting the warp knit.

According to one example ("Example 13"), a method of deploying constrained medical device includes arranging the medical device in a constraint, the constraint including at least one first constraining fiber arranged as a series of multiple loops to form a warp knit surrounding the medical device in a constrained configuration, the warp knit being configured to separate and be removed to deploy the medical device and at least one second constraining fiber arranged with the at least one first constraining fiber, the at least one second constraining fiber having at least one loop arranged in a non-warp knit pattern; and unravelling the constraint by applying tension to an end of the at least one second constraining fiber.

According to another example ("Example 14"), further to the method of Example 13, the at least one loop arranged in the non-warp knit pattern is arranged in a chain-link stich.

According to another example ("Example 15"), further to the method of Example 13, a first row of the row of knots is formed by the at least one first constraining fiber in the warp knit pattern and a second row of the row of knots is formed by the at least one second constraining fiber in a non-warp knit pattern.

According to one example ("Example 16"), a medical device deployment apparatus includes an implantable medical device; a constraint configured to releasably constrain the implantable medical device in a constrained configuration, the constraint including: a first row of knots formed by a first constraining fiber interwoven with a second constraining fiber to form a warp knit surrounding the medical device in the constrained configuration, and a second row of knots formed by the second constraining fiber interwoven with a third constraining fiber to form a non-warp knit surrounding the medical device in the constrained configuration; and a deployment line coupled to constraint and configured to unknit the constraint and deploy the implantable medical device from the constrained configuration.

According to another example ("Example 17"), further to the apparatus of Example 16, the apparatus also includes a third constraining fiber and a fourth constraining fiber, and wherein a third a third row of knots formed by the third constraining fiber interwoven with the fourth constraining fiber, and a fourth row of knots formed by the fourth constraining fiber interwoven with the first constraining fiber.

According to another example ("Example 18"), further to the apparatus of Example 17, at least one of the third row and the fourth row forms a warp knit surrounding the medical device in the constrained configuration and another of the third row and the fourth row forms a non-warp knit surrounding the medical device in the constrained configuration.

According to another example ("Example 19"), further to the apparatus of Example 16, an end of the first constraining fiber is joined with an end of the second constraining fiber to form the deployment line.

According to another example ("Example 20"), further to the apparatus of Example 16, the constraint is circumferential arranged about the implantable medical device and the deployment line is configured to axially interrupt the constraint to unknit the second constraining fiber.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 3 is an illustration of a first constraining fiber and a second constraining fiber, in accordance with an embodiment;

DETAILED DESCRIPTION

Definitions and Terminology

Figure 1:
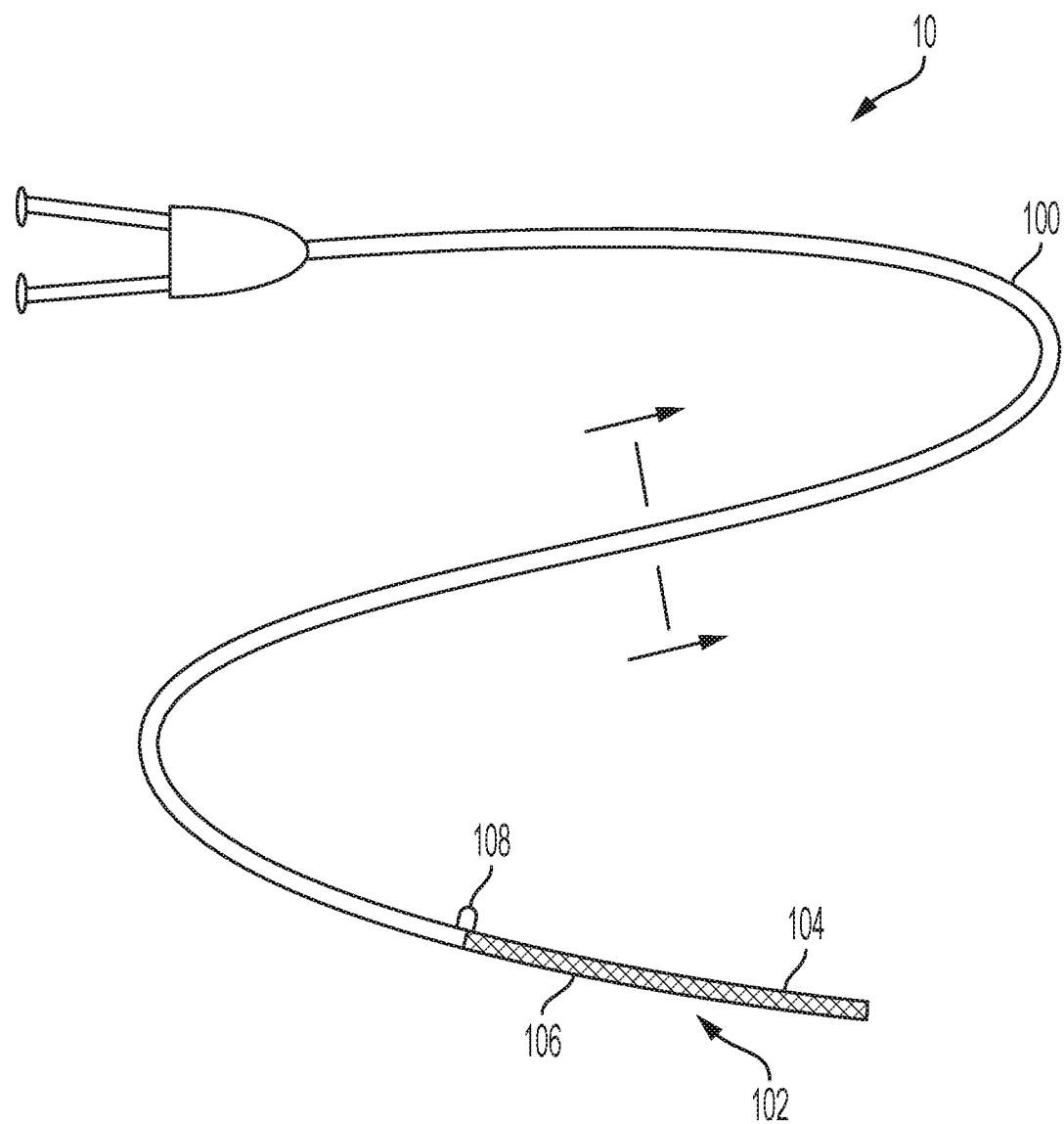
FIG. 1 is a top plan view of a delivery system including a catheter with a constraint, in accordance with an embodiment.

As the terms are used herein with respect to ranges of measurements "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

This disclosure is not meant to be read in a restrictive manner. For example, the terminology used in the application should be read broadly in the context of the meaning those in the field would attribute such terminology.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top", "bottom", "upper," "lower," "left," "right," "horizontal," "vertical," "upward,"

and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

A coordinate system is presented in the Figures and referenced in the description in which the "Y" axis corresponds to a vertical direction, the "X" axis corresponds to a horizontal or lateral direction, and the "Z" axis corresponds to the interior/exterior direction.

Description of Various Embodiments

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Various aspects of the present disclosure are directed toward apparatuses, systems, and methods that include forming or manufacturing a constraint. The constraining mechanisms are configured to hold, compress, or constrain an implantable medical device (e.g., a stent, stent-graft, balloon, filter, or other expandable medical device) in a delivery configuration prior to and during delivery to a target location. In certain instances, constraints may include one or more fibers that are arranged together. The fibers may be interwoven, stitched, or otherwise interlocked together circumferentially about the device. To remove the constraint, one or more of the fibers may be unknitted or disrupted from the other fibers in the constraint.

Constrained devices may store energy as a result of being constrained in a diameter smaller than a natural or deployed diameter. Thus, the devices may exhibit a radial displacement force against the zipper. During deployment of constrained devices, the radial force may force unknitting of the constraint without user involvement such that the constraint self un-knits. The aspects of the present disclosure, however, eliminate this accelerated deployment. As discussed in further detail below, the constraint may include a pattern or knot structure that lessens accelerated deployment.

FIG. 1 is a top plan view of a catheter 100 with a constraint 102, according to some embodiments. As shown in FIG. 1, the constraint 102 is configured to constrain an implantable medical device 104 to a delivery configuration. The constraint 102 may include one or more fibers 106 arranged about the implantable medical device 104 to maintain the constraint 102 in a constrained configuration.

The constraint 102 is arranged along a length of the implantable medical device 104. The constraint 102 is also circumferentially arranged about the implantable medical device 104 and may substantially cover the implantable medical device 104 for delivery. The one or more fibers 106 may be arranged within a lumen (not shown) of the catheter 100 and extend toward a proximal end of the catheter 100 that is arranged external to a patient during delivery of the implantable medical device 104. The one or more fibers 106 include a proximal end 108 that a user may apply tension to in order to release the constraint 102 and deploy the implantable medical device 104.

In certain instances, the one or more fibers 106 release similar to a rip cord such that interlocking portions (e.g., overlapping fibers or knots) sequentially release along the length of the implantable medical device 104. As is explained in greater detail below, the constraint 102 is formed by interlocking together the one or more fibers 106 directly on the implantable medical device 104. As compared to prior multiple fiber constraints which are knitted together and then subsequently arranged about a constrained device, the constraint 102 is formed directly on the implantable medical device 104. The expandable medical device 104 may be a stent, stent-graft, a balloon, or a similar device.

Figure 2:
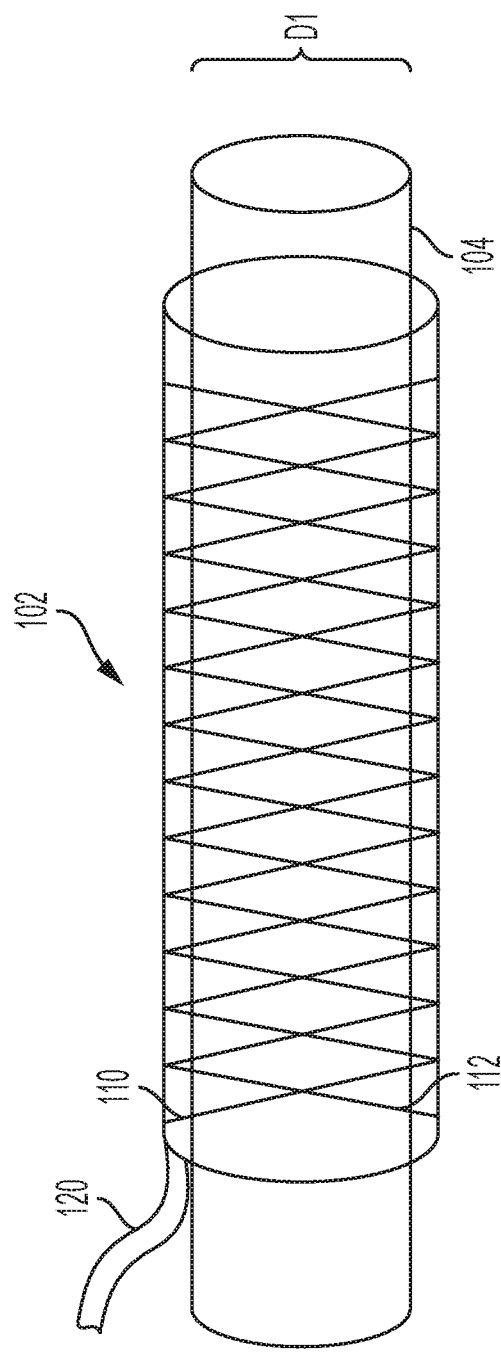
FIG. 2 is a side view of an implantable medical device including a constraint, in accordance with an embodiment.

FIG. 2 is a side view of the device 104 including the constraint 102, in accordance with an embodiment. As shown, the device 104 includes a delivery diameter D1 and a deployed diameter D2 (not shown) that is larger than the delivery diameter D1. The removable constraint 102 is attached to the device 104 at its delivery diameter D1. As shown, the constraint 102 includes at least one constraining fiber in the form of a warp knit. For example, the constraint 102 may include a first constraining fiber 110 and a second constraining fiber 112. The first and/or the second constraining fiber(s) 110, 112 may operate, for example, as a deployment line 120 configured to release the constraint 102 and transition the device 104 from the delivery diameter D1 to the deployed diameter D2 in response to a force applied to the deployment line 120 (which may be coupled to one or more of the knot rows 114 as discussed in further detail below).

The device 104 may have a desired deployed diameter D2 from about 5 mm-15 mm, or 6 mm-9 mm, or 6 mm-12 mm, 10 mm-20 mm, 15 mm-30 mm, 25 mm-45 mm, for example, and a delivery diameter D1 that is less than the deployed diameter D2. For example, in some instances, a ratio of the delivery diameter D1 of the device 104 to the deployed diameter D2 (not shown) of the device 104 is less than about 0.3, less than about 0.29, less than about 0.28, less than about 0.27, or less than about 0.26. For reference, the term "diameter" is not meant to require a circular cross-section, and is instead to be understood broadly to reference a maximum transverse cross-sectional dimension of a device 104.

FIG. 3 is an illustration of a first constraining fiber 110 and a second constraining fiber 112, in accordance with an embodiment. The first constraining fiber 110 and the second constraining fiber 112 each include a series of loops 220, 222, respectively. A single one of the series of loops 220, 222 is shown highlighted in FIG. 3 for ease of illustration. The first constraining fiber 110 and the second constraining fiber 112 may form a medical device deployment apparatus in certain instances. In certain instances, the first constraining fiber 110 and the second constraining fiber 112 are formed of a single constraining fiber that is looped upon itself to form two lines 110, 112.

In addition, the loops 220 of the first constraining fiber 110 may form a warp knit that surrounds a medical device in a constrained configuration as shown in FIG. 3. As discussed in further detail below with reference to FIGS. 4A-D, the first constraining fiber 110 forming a warp knit may be one of a group of fibers that form a warp knit in one or more rows of a constraint 102. The loops 222 of the second constraining fiber 112 may be arranged with the first constraining fiber 110 with the second constraining fiber 112 having at least one loop 224 arranged in a non-warp knit pattern. As shown in FIG. 3, the at least one loop 224 is a distal most loop of the multiple loops 222. In certain instances, each of the loops 22 of the second constraining fiber 112 may include the non-warp knit pattern. As noted above, the first constraining fiber 110 and the second constraining fiber 112 may form a constraint 102. In certain instances, the loop 224 having the non-warp knit pattern is arranged at a distal end of the constraint 102. In certain instances, the loop 224 may be arranged in a chain-link stich. The at least one loop 224 arranged in a non-warp knit pattern is arranged with the non-warp knit pattern and interrupts the warp knit The first constraining fiber 110 may be interwoven with the second constraining fiber 112 to form the constraint 102 with each of the first constraining fiber 100 and the second constraining fiber 122 forming a row of knots. As shown in FIG. 3, the first constraining fiber 110 and the second constraining fiber 112 are interwoven to form a single knot row 226. As discussed and shown in FIGS. 4A-B, the constraint 102 may include additional knot rows 226.

The constraint 102 may be deployed by interrupting the knot row 226 by applying tension to a deployment line. In certain instances, the first constraining fiber 110 and the second constraining fiber 112 may be combined to form a deployment line.

The knot row 226 may be one of a number of rows formed in the constraint 102. In certain instances, the first constraining fiber 110 may include multiple fibers knitted together. The first constraining fiber 110 may be a group or type of fiber that forms a pattern. Similarly, the second constraining fiber 112 may be a group or type of fiber that forms a pattern. For example, the first constraining fiber 110 (group) may form a first row of the row of knots in a warp knit pattern and a second row of the row of knots is formed by the second constraining fiber 112 (group) in a non-warp knit pattern. In certain instances, the non-warp knit pattern of the second row comprises chain-link stiches. In these instances the at least one first constraining fiber 110 includes the first constraining fiber 110 and a third constraining fiber and the at least one second constraining fiber 112 includes the second constraining fiber 112 and a fourth constraining fiber with the first constraining fiber, second constraining fiber, the third constraining fiber, and the fourth constraining fiber being interwoven to form a constraint 102 as discussed with reference to FIGS. 4A-D.

The non-warp knit pattern, knot or stitch, used in a constraint 102, that includes one or more additional knot rows with these rows formed in a knit or warp knit lessens the opportunity for self-deployment of the constraint 102. In certain instances, a chain stitch, formed by the one loop 224 in a row 226 or all loops in a row of a constraint 102, that includes one or more additional knot rows with these rows formed in a knit or warp knit, facilitates controlled deployment of the constraint 102.

Figure 4A:
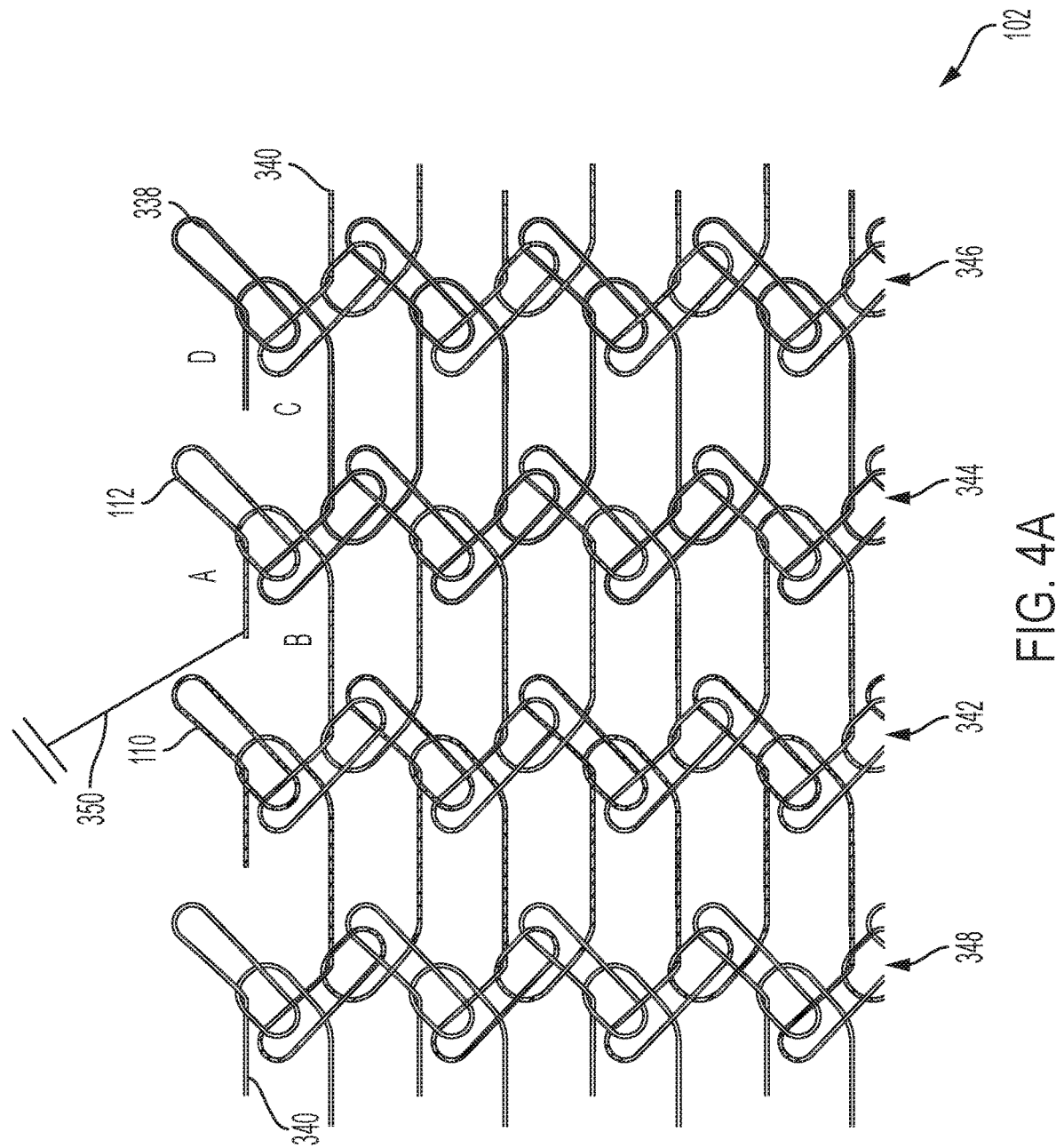
FIG. 4A is an illustration of a constraint in a first arrangement, in accordance with an embodiment.

FIG. 4A is an illustration of a constraint 102 in a first arrangement, in accordance with an embodiment. The constraint 102 is shown as a sheet of interwoven fibers, however, the constraint 102 may be arranged circumferentially about an implantable medical device. The constraint 102 can include a first constraining fiber 110 and a second constraining fiber 112 as described above with reference to FIG. 3 that form multiple knot rows. For example and as shown in FIG. 4A, the constraint 102 includes a first constraining fiber 110, a second constraining fiber 112, a third constraining fiber 338, and a fourth constraining fiber 340. The constraining fibers 110, 112, 338, 340 may be arranged together to form multiple knot rows 342, 344, 346, 348. In certain instances, the number of constraining fibers 110, 112, 338, 340 may be equal to the number of knot rows 342, 344, 346, 348. In addition, the constraining fibers 110, 112, 338, 340 may be interwoven or interlocked with one another to form the knot rows 342, 344, 346, 348.

In certain instances, the first row of knots 342 of the constraint 102 may be formed by the first constraining fiber 110 interwoven with the second constraining fiber 112. As shown, the first constraining fiber 110 are interwoven with the second constraining fiber 112 to form the knot row 342 in a warp knit. The knot row 342 may be a warp knit when the constraint 102 is surrounding the medical device in the constrained configuration.

In addition, the second row of knots 344 may be formed by the second constraining fiber 112 interwoven with the third constraining fiber 338. The second constraining fiber 112 may be interwoven with the third constraining fiber 338 to form a non-warp knit with the row of knots 344. The knot row 344 may be a warp knit when the constraint 102 is surrounding the medical device in the constrained configuration.

As shown in FIG. 4A, the constraint 102 includes the multiple knot rows 342, 344, 346, 348 with the first row of knots 342 being formed by the first constraining fiber 110 interwoven with the second constraining fiber 112, the second row of knots 344 formed by the second constraining fiber 112 interwoven with the third constraining fiber 388, the third row of knots 346 formed by the third constraining fiber 348 interwoven with the fourth constraining fiber 340, and the fourth row of knots 348 formed by the fourth constraining fiber 340 interwoven with the first constraining fiber 110.

In certain instances, one or more of the rows 342, 344, 346, 348 forms a knit or a warp knit pattern with loops of the constraining fibers 110, 112, 338, 340 and another of the one or more of the rows 342, 344, 346, 348 forms a non-knit or non-warp knit pattern with one or more of the loops (e.g., a distal loop as described with reference to FIG. 3) of the constraining fibers 110, 112, 338, 340. In certain instances, at least one of the third row 346 and the fourth row 348 forms a warp knit surrounding the medical device in the constrained configuration and another of the third row 346 and the fourth row 348 forms a non-warp knit surrounding the medical device in the constrained configuration. The constraint 102 may include three of the rows 342, 344, 346, 348 in the warp pattern and one of the rows 342, 344, 346, 348 in a non-warp pattern. The one or more rows 342, 344, 346, 348 being in the non-warp pattern includes a single knot being arranged in a non-warp stitch (e.g., a chain stitch), two or more of the knots of the one or more rows 342, 344, 346, 348 being a non-warp stitch, multiple knots of the one or more rows 342, 344, 346, 348 being a non-warp stitch, alternating knots of the one or more rows 342, 344, 346, 348 being a non-warp stitch, two or more or all of the knots of the one or more rows 342, 344, 346, 348 being in a non-warp stitch.

The non-warp pattern of one or more of the rows 342, 344, 346, 348 may lessen the opportunity for accelerated or unwanted deployment of the constraint 102. The different non-warp pattern of one or more of the rows 342, 344, 346, 348 interrupts the pattern of the constraint 102.

A deployment line 350 may be coupled to an end of the second constraining fiber 112 (e.g., the fiber having the non-warp knit knot or knots) to force deployment of the constraint 102. An end of the first constraining fiber 110 is joined with an end of the second constraining fiber 112, which may be combined to form the deployment line 350. In other instances, the deployment line 350 is the second constraining fiber 112 or a separate line or wire. In certain instances, the deployment line 350 is configured to unknit the second constraining fiber 112 and deploy the implantable medical device from the constrained configuration. As noted above, the constraint 102 may be circumferential arranged about the implantable medical device and the deployment line 350 may be configured to axially interrupt the constraint 102 to unknit the second constraining fiber 112 as is shown in FIGS. 4B-C.

Figure 4B:
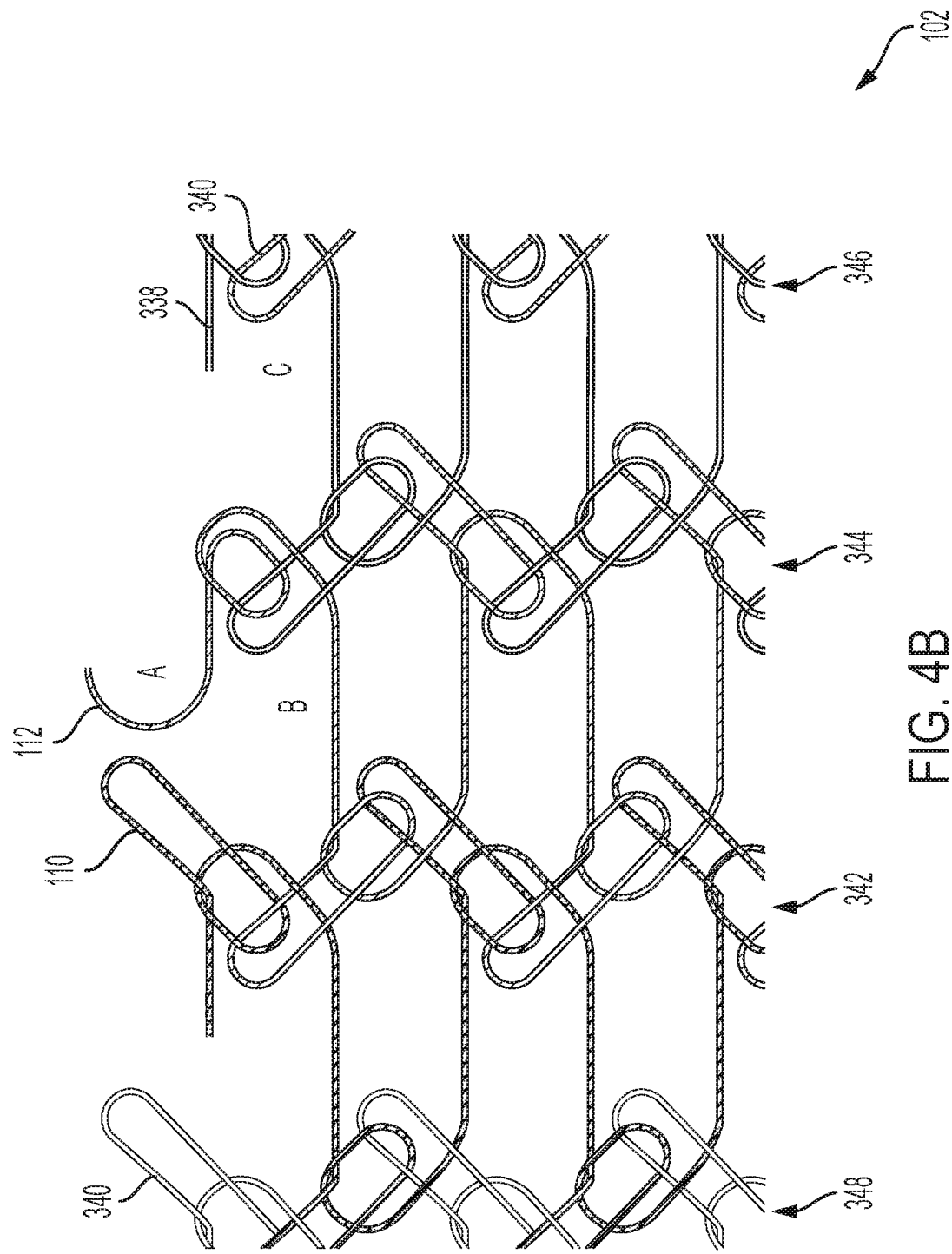
FIG. 4B is an illustration of the constraint, shown in FIG. 4A, in a second arrangement, in accordance with an embodiment.
Figure 4C:
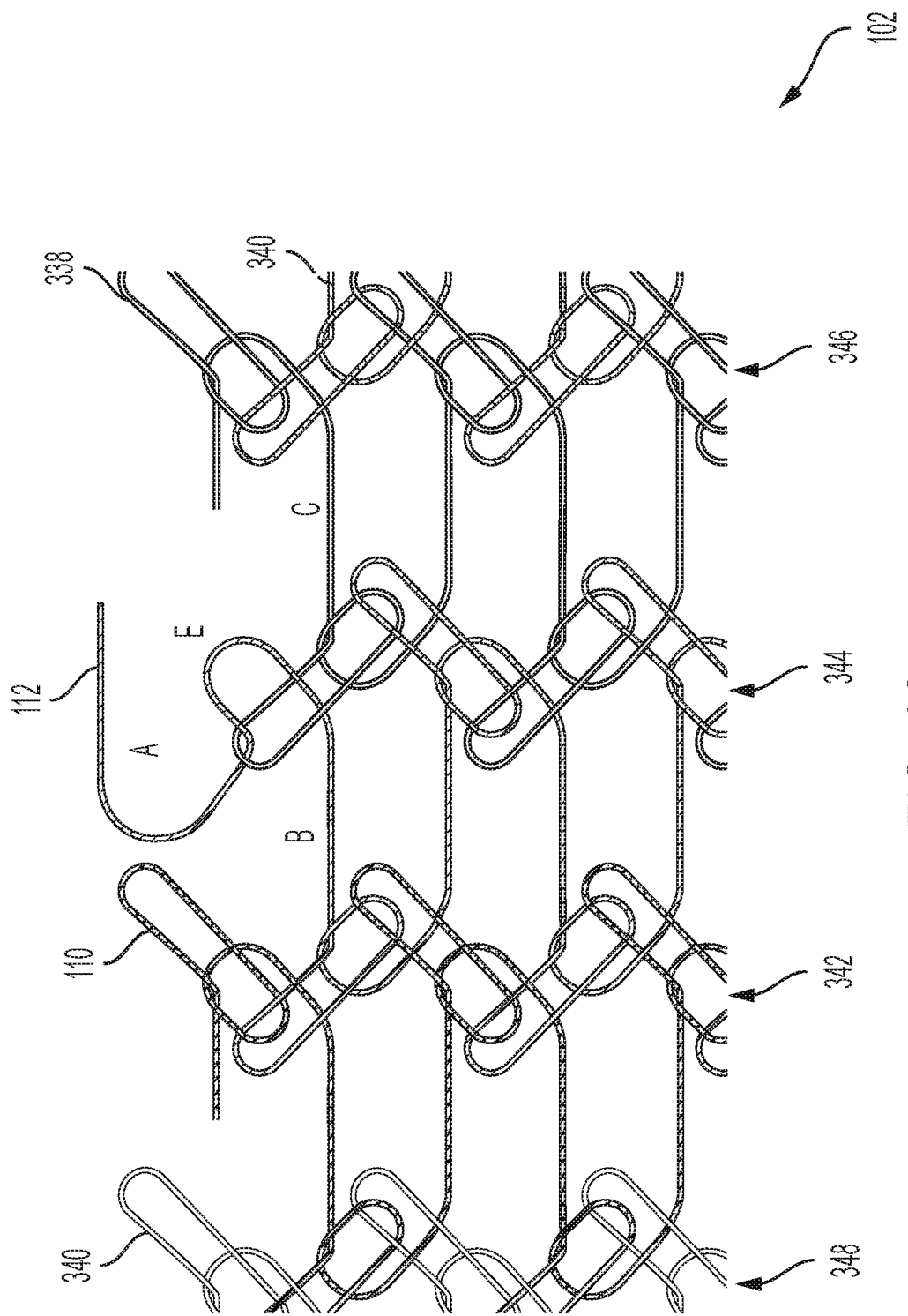
FIG. 4C is an illustration of the constraint, shown in FIGS. 4A-B, in a third arrangement, in accordance with an embodiment.
Figure 4D:
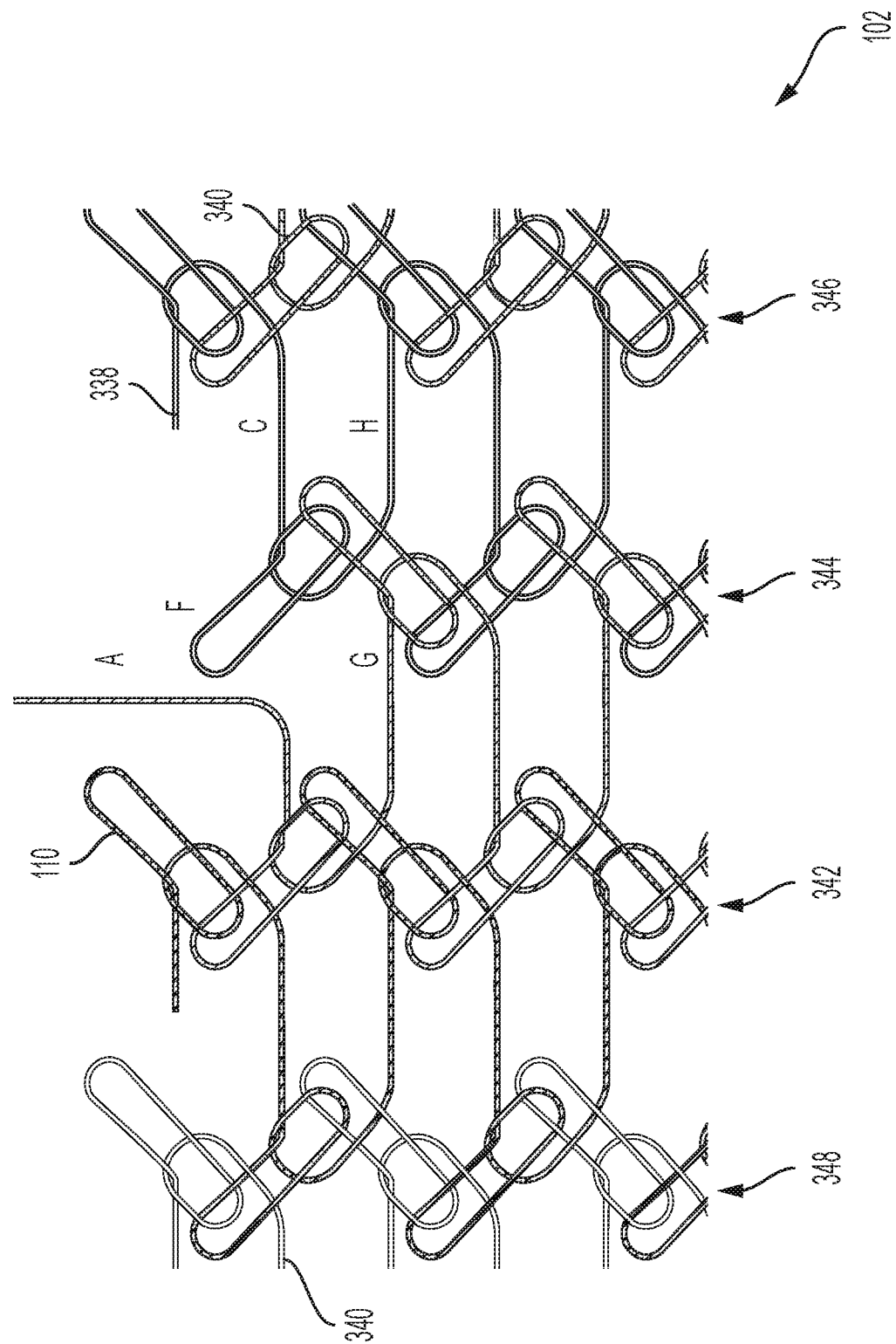
FIG. 4D is an illustration of the constraint, shown in FIGS. 4A-C, in a fourth arrangement, in accordance with an embodiment.

FIGS. 4B-C are illustrations of the constraint, shown in FIG. 4A, in different steps of the constraint 102 unknitting. A-H, as shown in FIGS. 4A-D, are location indicators of portions or sections of the second constraining fiber 112. In comparing the arrangement of the second constraining fiber 112 in FIG. 4A and FIG. 4B, the loop or chain stitch D has been pulled axially. Additional pulling of the A section of the second constraining fiber 112 removes the slack remnants from loop D section of the second constraining fiber 112 and shows that a warp knit rows 342, 346, 348 is holding the constraint 102 together (e.g., as shown in FIGS. 4B-C).

In certain instances, the second constraining fiber 112 may include a warp knit in the knot row 344 subsequent to loop or chain stitch D. Pulling the second constraining fiber 112 or the deployment line 350 would also untie the warp knit E section of the second constraining fiber 112. FIG. 4C shows loop E of the second constraining line 112 pulled out of the row 344. The next knot in row 344 may be chain stitch which requires an axial load applied to the second constraining fiber 112 or deployment line 350. As sections of the second constraining fiber 112 are removed from the knot row 344, the sections become a part of the deployment line 350. Remaining sections of the second constraining fiber 112 may be warp knit or non-warp knit knots.

Figure 5A:
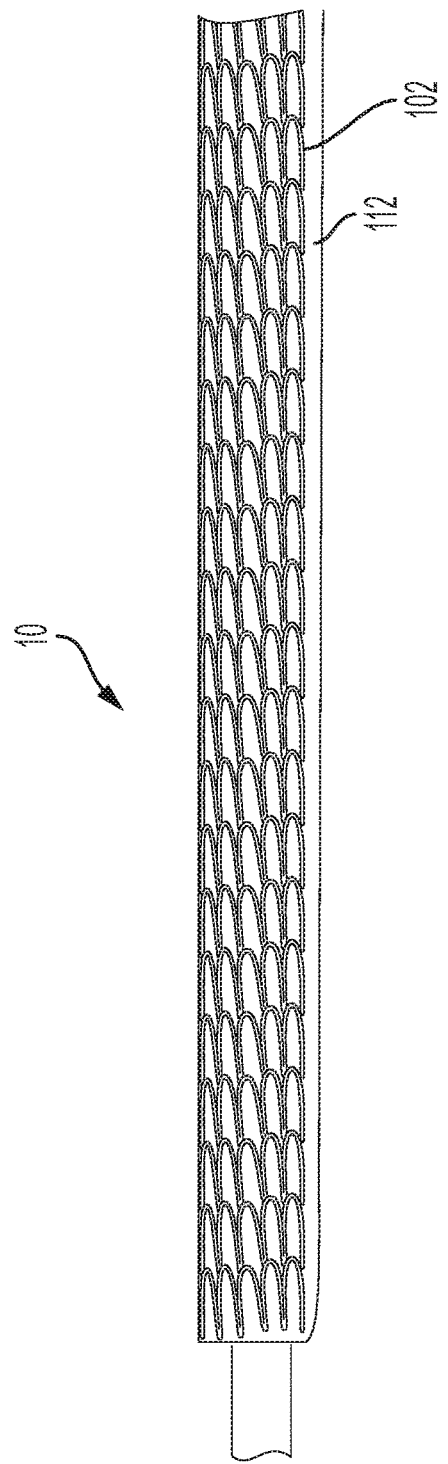
FIG. 5A is an image of a delivery system in a delivery configuration, in accordance with an embodiment.
Figure 5B:
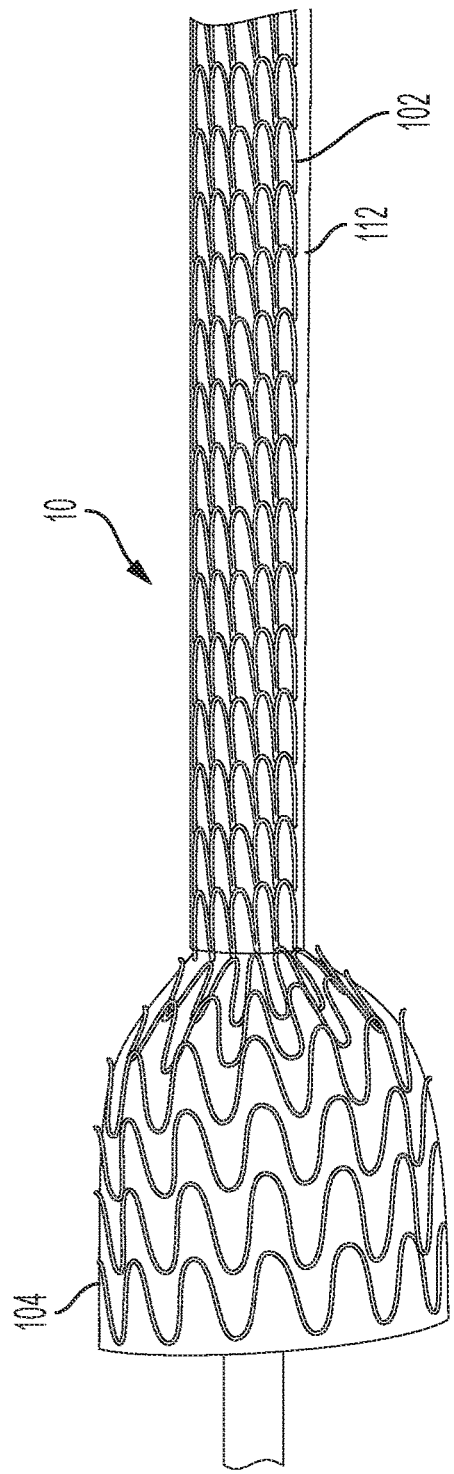
FIG. 5B is an image of the delivery system, shown in FIG. 5A, in a semi-deployed configuration, in accordance with an embodiment.

FIG. 5A is an image of a delivery system 10 in a delivery configuration, in accordance with an embodiment. FIG. 6B is an image of a delivery system 10 in a semi-deployed configuration, in accordance with an embodiment. As shown, disrupting one of the constraining fibers (e.g., the second constraining fiber 112, for example) of a knot row initiates unravelling of at least a portion of the constraint 102, as shown in FIG. 5B.

The inventive concepts of this application have been described above both generically and with regard to specific embodiments. It will be apparent to those skilled in the art that various modifications and variations can be made in the embodiments without departing from the scope of the disclosure. Thus, it is intended that the embodiments cover the modifications and variations of the inventive concepts provided they come within the scope of the appended claims and their equivalents.

What is claimed is:

1. A medical device deployment apparatus, the apparatus comprising:
   a medical device;
   at least one first constraining fiber arranged as a series of multiple loops to form a warp knit surrounding the medical device in a constrained configuration, the warp knit being configured to separate and be removed to deploy the medical device; and
   at least one second constraining fiber arranged with the at least one first constraining fiber in the warp knit, the at least one second constraining fiber having at least one loop arranged in a non-warp knit pattern including a chain-link stitch.

2. The apparatus of claim 1, wherein the at least one first constraining fiber comprises multiple fibers knitted together.

3. The apparatus of claim 1, wherein the first constraining fiber and the at least one second constraining fiber form a constraint, and the at least one loop arranged in the non-warp knit pattern is arranged at a distal end of the constraint.

4. The apparatus of claim 3, wherein the at least one loop arranged in the non-warp knit pattern is arranged in a chain-link stitch.

5. The apparatus of claim 4, wherein the at least one first constraining fiber is interwoven with the at least one second constraining fiber to form the constraint with each of the at least one first constraining fiber and the at least one second constraining fiber forming a row of knots.

6. The apparatus of claim 5, wherein a first row of the row of knots is formed by the at least one first constraining fiber in the warp knit pattern and a second row of the row of knots is formed by the at least one second constraining fiber in a non-warp knit pattern.

7. The apparatus of claim 6, wherein the non-warp knit pattern of the second row comprises chain-link stitches.

8. The apparatus of claim 1, wherein the at least one first constraining fiber includes the first constraining fiber and a third constraining fiber, and the at least one second constraining fiber includes the second constraining fiber and a fourth constraining fiber with the first constraining fiber, second constraining fiber, the third constraining fiber, and the fourth constraining fiber being interwoven to form a constraint.

9. The apparatus of claim 8, wherein the constraint includes multiple knot rows including a first row of knots formed by the first constraining fiber interwoven with the second constraining fiber, and a second row of knots formed by the second constraining fiber interwoven with the third constraining fiber, a third row of knots formed by the third constraining fiber interwoven with the fourth constraining fiber, and a fourth row of knots formed by the fourth constraining fiber interwoven with the first constraining fiber.

10. The apparatus of claim 9, wherein at least one of the multiple knot rows forms a warp knit surrounding the medical device in the constrained configuration and another one of the multiple knot rows forms a non-warp knit surrounding the medical device in the constrained configuration.

11. The apparatus of claim 1, wherein the at least one first constraining fiber and the at least one second constraining fiber combine to form a deployment line.

12. The apparatus of claim 1, wherein the warp knit is configured to separate and be removed to deploy the medical device and the warp knit is arranged with the non-warp knit pattern interrupting the warp knit.

13. A method of deploying constrained medical device, the method comprising:
   arranging the medical device in a constraint, the constraint including at least one first constraining fiber arranged as a series of multiple loops to form a warp knit surrounding the medical device in a constrained configuration, the warp knit being configured to separate and be removed to deploy the medical device and at least one second constraining fiber arranged with the at least one first constraining fiber, the at least one second constraining fiber having at least one loop arranged in a non-warp knit pattern including a chain-link stitch; and
   unravelling the constraint by applying tension to an end of the at least one second constraining fiber.

14. The method of claim 13, wherein the at least one loop arranged in the non-warp knit pattern is arranged in a chain-link stitch.

15. The method of claim 13, wherein a first row of knots is formed by the at least one first constraining fiber in the warp knit pattern and a second row of knots is formed by the at least one second constraining fiber in a non-warp knit pattern.

16. A medical device deployment apparatus, the apparatus comprising:
- an implantable medical device;
- a constraint configured to releasably constrain the implantable medical device in a constrained configuration, the constraint including:
  - a first row of knots formed by a first constraining fiber interwoven with a second constraining fiber to form a warp knit surrounding the medical device in the constrained configuration, and
  - a second row of knots formed by the second constraining fiber interwoven with a third constraining fiber to form a non-warp knit, including a chain-link stitch surrounding the medical device in the constrained configuration; and
- a deployment line coupled to the constraint and configured to unknit the constraint and deploy the implantable medical device from the constrained configuration.

17. The apparatus of claim 16, further comprising the third constraining fiber and a fourth constraining fiber, and wherein a third row of knots is formed by the third constraining fiber interwoven with the fourth constraining fiber, and a fourth row of knots is formed by the fourth constraining fiber interwoven with the first constraining fiber.

18. The apparatus of claim 17, wherein at least one of the third row of knots and the fourth row of knots forms a warp knit surrounding the medical device in the constrained configuration and another of the third row and the fourth row forms a non-warp knit surrounding the medical device in the constrained configuration.

19. The apparatus of claim 16, wherein an end of the first constraining fiber is joined with an end of the second constraining fiber to form the deployment line.

20. The apparatus of claim 16, wherein the constraint is circumferentially arranged about the implantable medical device and the deployment line is configured to axially interrupt the constraint to unknit the second constraining fiber.

* * * * *